US012172308B2

(12) United States Patent
Motoyoshi

(10) Patent No.: US 12,172,308 B2
(45) Date of Patent: Dec. 24, 2024

(54) METHOD OF DETERMINING CONTROL POSITION OF ROBOT AND ROBOT SYSTEM

(71) Applicant: Seiko Epson Corporation, Tokyo (JP)

(72) Inventor: Masaki Motoyoshi, Azumino (JP)

(73) Assignee: SEIKO EPSON CORPORATION (JP)

( * ) Notice: Subject to any disclaimer, the term of this patent is extended or adjusted under 35 U.S.C. 154(b) by 442 days.

(21) Appl. No.: 17/560,717

(22) Filed: Dec. 23, 2021

(65) Prior Publication Data

US 2022/0203520 A1 Jun. 30, 2022

(30) Foreign Application Priority Data

Dec. 24, 2020 (JP) ................................ 2020-214713

(51) Int. Cl.
*B25J 9/16* (2006.01)
*G05B 19/4155* (2006.01)

(52) U.S. Cl.
CPC ........ *B25J 9/1602* (2013.01); *G05B 19/4155* (2013.01); *G05B 2219/50391* (2013.01)

(58) Field of Classification Search
CPC ....... G05B 19/4155; G05B 2219/50391; B25J 9/1602
See application file for complete search history.

(56) References Cited

U.S. PATENT DOCUMENTS

| 2007/0106421 | A1* | 5/2007 | Kamrani | B25J 9/1661 |
| | | | | 700/245 |
| 2010/0168915 | A1* | 7/2010 | Kagawa | B25J 9/1692 |
| | | | | 901/41 |
| 2014/0371899 | A1* | 12/2014 | Nagaoka | G05B 19/404 |
| | | | | 700/170 |
| 2018/0222049 | A1* | 8/2018 | Suzuki | B25J 9/161 |
| 2020/0189108 | A1 | 6/2020 | Suzuki et al. | |

FOREIGN PATENT DOCUMENTS

| CN | 111409108 A | * 7/2020 | ......... B25J 19/0095 |
| JP | H07-080785 A | 3/1995 | |
| JP | H08-290380 A | 11/1996 | |
| JP | 2010-142901 A | 7/2010 | |
| WO | 2018-092236 A1 | 5/2018 | |

* cited by examiner

*Primary Examiner* — Stephen Holwerda
*Assistant Examiner* — Tristan J Greiner
(74) *Attorney, Agent, or Firm* — Harness, Dickey & Pierce, P.L.C.

(57) ABSTRACT

A method for determining a control position of a robot includes (a) acquiring N real reference positions in a real space and N control reference positions in a robot control coordinate system, (b) setting M figures having vertices in a plurality of real reference positions of the N real reference positions within the real space, and obtaining a transform function expressing a correspondence relationship between a real position and a control position within each figure, (c) receiving input of a target position of the control point in the real space, (d) selecting an object figure for calculation of a control position for the target position from the M figures, and (e) calculating a target control position for the target position using the transform function with respect to the object figure.

10 Claims, 8 Drawing Sheets

| | MAXIMUM ERROR | AVERAGE ERROR |
|---|---|---|
| WITHOUT CORRECTION | 0.158 mm | 0.107 mm |
| 4 REFERENCE POINTS (FIG. 7) | 0.041 mm | 0.025 mm |
| 5 REFERENCE POINTS (FIG. 8) | 0.033 mm | 0.016 mm |

METHOD OF DETERMINING CONTROL POSITION OF ROBOT AND ROBOT SYSTEM

The present application is based on, and claims priority from JP Application Serial Number 2020-214713, filed Dec. 24, 2020, the disclosure of which is hereby incorporated by reference herein in its entirety.

BACKGROUND

1. Technical Field

The present disclosure relates to a method of determining a control position of a robot and a robot system.

2. Related Art

JP-A-8-290380 discloses a method of correcting a control position of a robot for improvement of robot motion accuracy. In the method, mechanism parameters for a robot including an arm length, an origin of a joint rotation axis, and the like are calculated based on a difference between a real end position of a robot and an end position in a robot control coordinate system used when a control apparatus controlling the robot moves the robot, and the control position of the robot is corrected based on the calculated mechanism parameters.

However, in related art, it is necessary to measure many mechanism parameters and there is a problem that the measurements require a large-scaled apparatus.

SUMMARY

According to a first aspect of the present disclosure, a method of determining a control position of a robot is provided. The method includes (a) acquiring N real reference positions in a real space and N control reference positions in a robot control coordinate system when a control point of the robot is located in the respective N real reference positions, N being an integer equal to or larger than three, (b) setting M figures having vertices in a plurality of real reference positions of the N real reference positions within the real space, and obtaining a transform function expressing a correspondence relationship between a real position and a control position within each figure, M being an integer equal to or larger than one, (c) receiving input of a target position of the control point in the real space, (d) selecting an object figure for calculation of a control position for the target position from the M figures, and (e) calculating a target control position as a control position in the robot control coordinate system for the target position using the transform function with respect to the object figure.

According to a second aspect of the present disclosure, a robot system determining a control position of a robot is provided. The robot system includes a robot, and a control unit that controls the robot. The control unit executes (a) processing of acquiring N real reference positions in a real space and N control reference positions in a robot control coordinate system when a control point of the robot is located in the respective N real reference positions, N being an integer equal to or larger than three, (b) processing of setting M figures having vertices in a plurality of real reference positions of the N real reference positions within the real space, and obtaining a transform function expressing a correspondence relationship between a real position and a control position within each figure, M being an integer equal to or larger than one, (c) processing of receiving input of a target position of the control point in the real space, (d) processing of selecting an object figure for calculation of a control position for the target position from the M figures, and (e) processing of calculating a target control position as a control position in the robot control coordinate system for the target position using the transform function with respect to the object figure.

DESCRIPTION OF EXEMPLARY EMBODIMENTS

Figure 1:
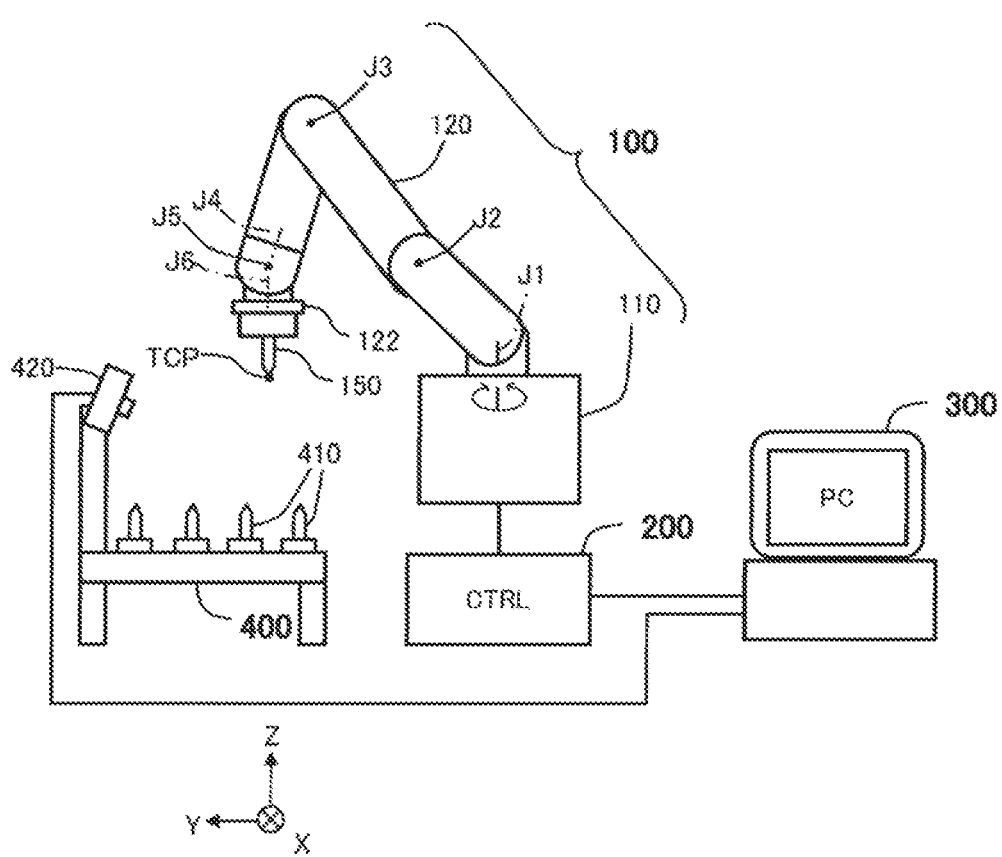
FIG. 1 is an explanatory diagram of a configuration example of a robot system in an embodiment.

FIG. 1 is an explanatory diagram showing an example of a robot system in one embodiment. The robot system includes a robot 100, a control apparatus 200 that controls the robot 100, an information processing apparatus 300, and a table 400. The information processing apparatus 300 is e.g. a personal computer. In FIG. 1, three axes X, Y, Z defining an orthogonal coordinate system in a three-dimensional space are drawn. The X-axis and the Y-axis are axes in horizontal directions and the Z-axis is an axis in vertical directions. Hereinafter, the three-dimensional space is also referred to as "real space".

The robot 100 includes a base 110 and an arm 120. The arm 120 is sequentially coupled by six joints. An end effector 150 is attached to an arm end 122 as a distal end portion of the arm 120. A control point TCP of the robot 100 is set in a distal end portion of the end effector 150. Note that the position of the control point TCP can be set to any position. Note that, to determine the position of the control point TCP using positioning jigs 410 or a three-dimensional measuring instrument 420, which will be described later, it is preferable to set the control point TCP in the distal end portion of the end effector 150.

The arm 120 is configured by sequentially coupling six joints J1 to J6. Of these joints J1 to J6, the three joints J2, J3, J5 are bending joints and the other three joints J1, J4, J6 are twisting joints. In the embodiment, a six-axis robot is exemplified, however, a robot including an arbitrary arm mechanism having one or more joints can be used. The robot 100 of the embodiment is a vertical articulated robot, however, a horizontal articulated robot may be used. Further, the present disclosure can be applied to another apparatus than the robot.

On the table 400, the plurality of positioning jigs 410 are placed. The positioning jigs 410 are jigs used for positioning of the control point TCP of the end of the robot. The three-dimensional measuring instrument 420 that can measure a three-dimensional position is placed on the support of the table 400. The three-dimensional measuring instrument 420 can be used for measuring the position of the control point TCP of the robot in the three-dimensional space. Note that the three-dimensional measuring instrument 420 or the positioning jigs 410 may be omitted.

Figure 2:
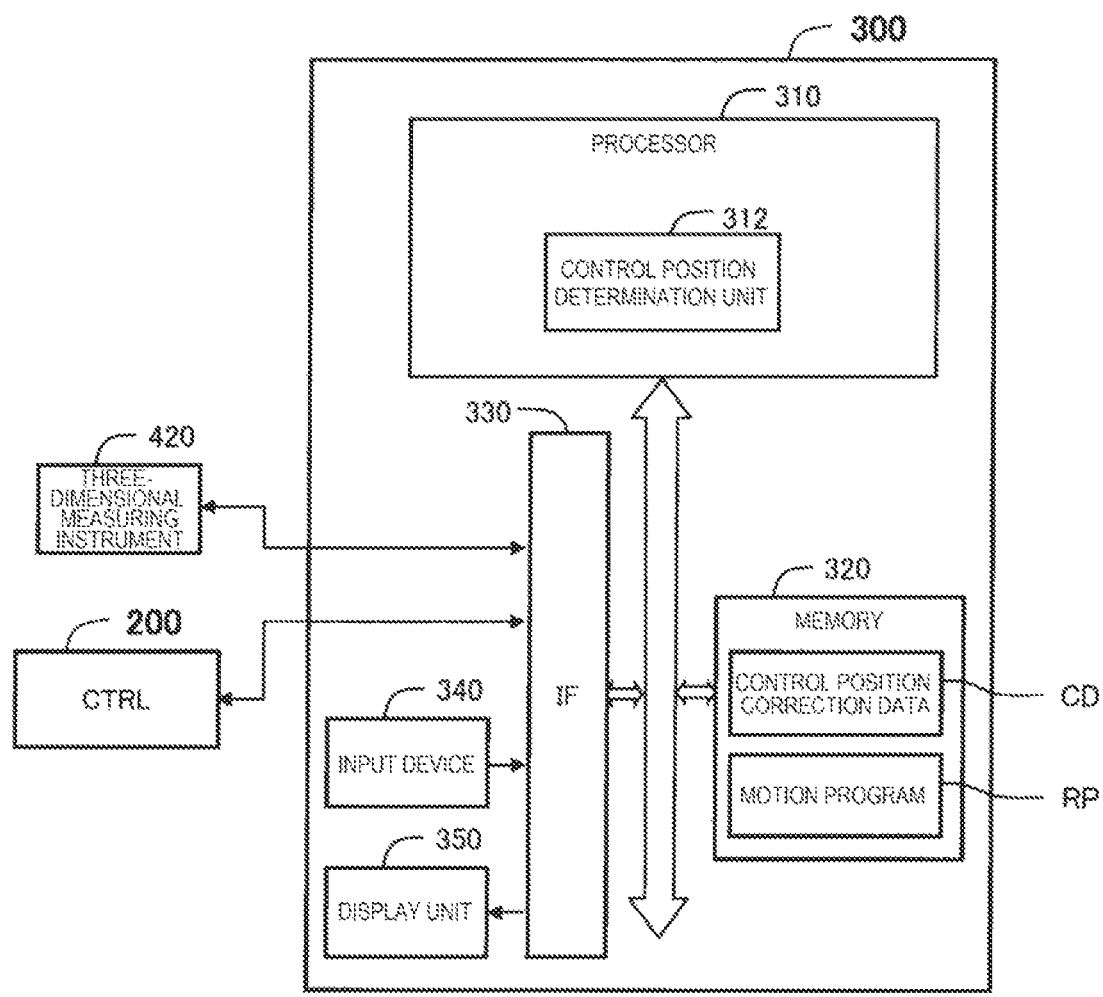
FIG. 2 is a functional block diagram of an information processing apparatus.

FIG. 2 is a block diagram showing functions of the information processing apparatus 300. The information processing apparatus 300 has a processor 310, a memory 320, an interface circuit 330, and an input device 340 and a display unit 350 coupled to the interface circuit 330. Further, the three-dimensional measuring instrument 420 and the control apparatus 200 are coupled to the interface circuit 330.

The processor 310 functions as a control position determination unit 312 that determines a control position of the robot. The functions of the control position determination unit 312 is realized by the processor 310 executing a computer program stored in the memory 320. Note that part or all of the functions of the control position determination unit 312 may be realized by a hardware circuit.

In the memory 320, control position correction data CD and a motion program RP are stored. The control position correction data CD contains figures for control position correction and transform functions, which will be described later. The motion program RP includes a plurality of motion commands for moving the robot 100.

Figure 3:
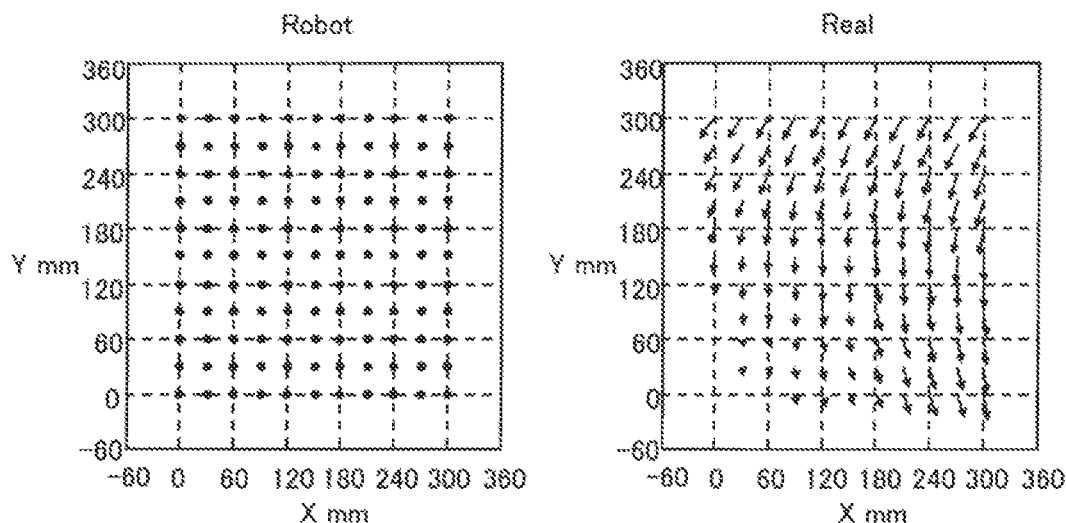
FIG. 3 is an explanatory diagram showing an example of errors in position control of a robot.

FIG. 3 is an explanatory diagram of an example of errors in position control of the robot 100. The left part in FIG. 3 shows control positions in a robot control coordinate system and the right part shows errors in the real space. "Robot control coordinate system" is a coordinate system expressing a position and a posture of the robot 100 used in the motion command for controlling the robot 100. In the example of FIG. 3, a state in which the control positions are set at intervals of 30 mm in the X directions and the Y directions in the robot control coordinate system is assumed, and arrows drawn in the real space show errors in position control. That is, the start point of the arrow is a target position and the pointer side of the arrow is an end position containing an error. "End position" refers to a position of the control point TCP. Note that, for convenience of illustration, the arrow is drawn in the length with 200 times of an amount of error. In the embodiment, to reduce the error, processing of correcting the control position of the robot control coordinate system is executed.

Figure 4:
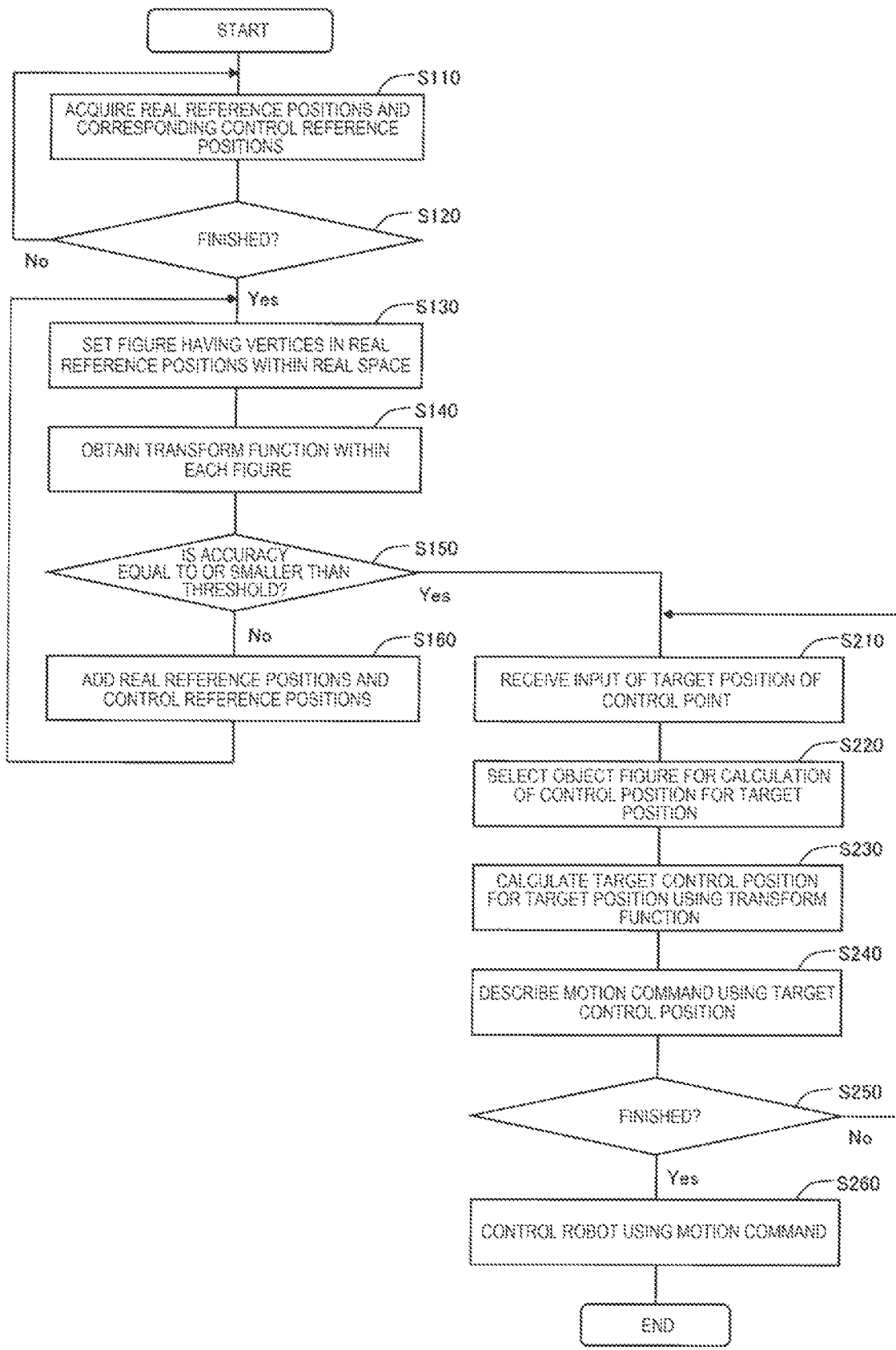
FIG. 4 is a flowchart showing a procedure of control position correction processing in an embodiment.

FIG. 4 is a flowchart showing a procedure of the control position correction processing in an embodiment. At step S110, the control position determination unit 312 acquires a real reference position and a control reference position corresponding to the real reference position. The processing at step S110 may be performed using the positioning jigs 410 or the three-dimensional measuring instrument 420.

Figure 5:
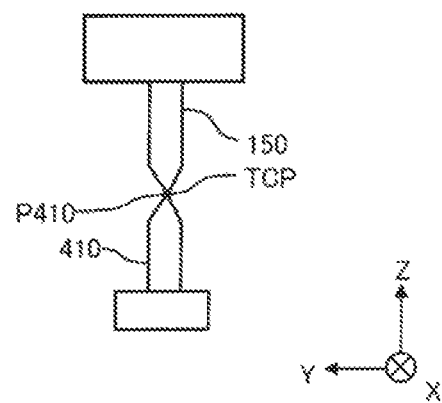
FIG. 5 is an explanatory diagram showing an example of a positioning jig.

FIG. 5 is an explanatory diagram showing an example of the positioning jig 410. Regarding the positioning jig 410, a real reference position P410 is set at the distal end thereof and the three-dimensional position of the positioning jig 410 in the real space is measured in advance. The positioning jig 410 is placed by a worker. The control point TCP of the robot 100 is moved into contact with the real reference position P410 of the positioning jig 410, and thereby, the control position in the robot control coordinate system at the time can be acquired as a control reference position corresponding to the real reference position P410.

Figure 6:
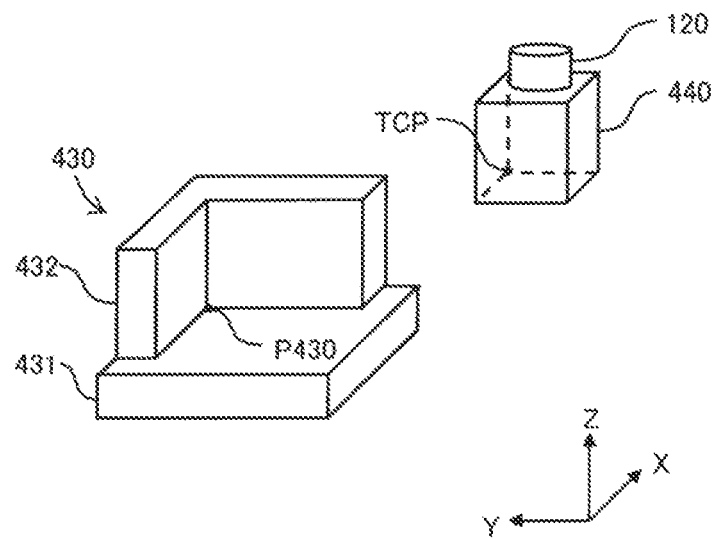
FIG. 6 is an explanatory diagram showing another example of the positioning jig.

FIG. 6 is an explanatory diagram showing another example of the positioning jig. This positioning jig 430 has a base plate 431 in a planar shape and a wall portion 432 in an L-shape placed on the base plate 431. The wall portion 432 bends at a right angle and a real reference position P430 is set at a point at which the bending part of the wall portion 432 and the surface of the base plate 431 contact. A positioning auxiliary portion 440 is coupled to the distal end of the arm 120 of the robot 100. The positioning auxiliary portion 440 has a rectangular parallelepiped shape and the control point TCP is set at a vertex of the bottom surface thereof. The control point TCP of the robot 100 is moved into contact with the real reference position P430 of the positioning jig 430, and thereby, the control position in the robot control coordinate system at the time can be acquired as a control reference position corresponding to the real reference position P430. Further, when the positioning jig 430 and the positioning auxiliary portion 440 contact each other on the three surfaces, the configuration of the control point TCP of the robot 100 is uniquely determined, and thereby, the control posture in the robot control coordinate system at the time can be acquired as a control reference posture corresponding to the real posture in the real reference position P430. Note that, as the positioning jig, other jigs having various shapes than those shown in FIGS. 5 and 6 can be used.

The real reference position and the control reference position in the robot control coordinate system may be acquired not using the above described positioning jigs, but using the three-dimensional measuring instrument 420. In this case, first, the control point TCP of the robot 100 is positioned using the control reference position in the robot control coordinate system and, under the condition, the three-dimensional position of the control point TCP in the real space is measured by the three-dimensional measuring instrument 420 and used as the real reference position. In this manner, at step S110, the real reference position and the control reference position corresponding to the real reference position may be acquired using the positioning jigs or the three-dimensional measuring instrument 420. Note that, when the positioning jigs are used, the real reference position is set by the worker. On the other hand, when the three-dimensional measuring instrument 420 is used, the control reference position is set by the worker. In this manner, one of the real reference position and the control reference position is selected by the worker, and thereby, an area in which the accuracy of position control is increased may be optionally selected by the worker.

At step S120, whether or not all of the processing at step S110 ends is determined. In the embodiment, for N as an integer equal to or larger than three, step S110 is repeatedly executed until N real reference positions in the real space and N control reference positions in the robot control coordinate system are acquired.

When all of the processing at step S110 ends, the process goes to step S130 and the control position determination unit 312 sets figures having vertices in the plurality of real reference positions within the real space. Hereinafter, the figures are also referred to as "figures for control position correction". The number of figures M may be set to any number equal to or larger than one.

Figure 7:
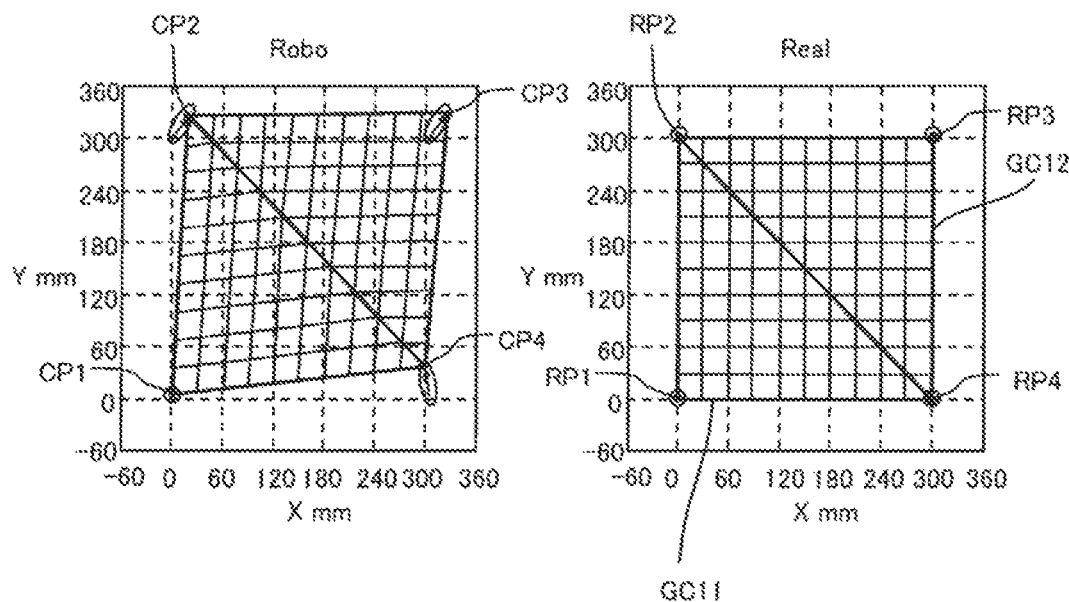
FIG. 7 is an explanatory diagram showing an example of figures for control position correction.

FIG. 7 is an explanatory diagram showing an example of figures for control position correction. In this example, through the processing at step S110, four real reference positions RP1 to RP4 in the real space and four control reference positions CP1 to CP4 in the robot control coordinate system are acquired. In the real space, an area surrounded by the four real reference positions RP1 to RP4 is divided into two figures GC11, GC12. These figures GC11, GC12 are triangles. As a division method, any division method e.g. Delaunay triangulation or the like can be used, or the worker may divide the area.

At step S140, the control position determination unit 312 obtains a transform function expressing a correspondence relationship between the reference position and the control position in each of the figures GC11 and GC12. For example, the transform function may be expressed by the following expressions.

$$P_{ctrl} = A \times P_{real} \quad (1)$$

$$P_{ctrl} = \begin{bmatrix} x_{ctrl} \\ y_{ctrl} \\ 1 \end{bmatrix} \quad (2)$$

$$A = \begin{bmatrix} a_{11} & a_{12} & b_1 \\ a_{21} & a_{22} & b_2 \\ 0 & 0 & 1 \end{bmatrix} \quad (3)$$

$$P_{real} = \begin{bmatrix} x_{real} \\ y_{real} \\ 1 \end{bmatrix} \quad (4)$$

Here, $P_{ctrl}$ is a control position in the robot control coordinate system, $P_{real}$ is a real position in the real space, and A is a transform function. The transform function A is a transform equation expressing affine transform. $a_{11}$, $a_{12}$, $a_{21}$, $a_{22}$, $b_1$, $b_2$ are coefficients and take different values with respect to each of the figures GC11, GC12. The real position $P_{real}$ is transformed to the control position $P_{ctrl}$ using the transform function, and thereby, errors in position control can be reduced.

At step S150, the control of the robot 100 is performed using the control positions transformed using the transform function, and thereby, whether or not errors in position control are equal to or smaller than a predetermined threshold is determined. The errors in position control may be confirmed by measurement of the real positions of the control point TCP, when the robot 100 is controlled using the control positions transformed using the transform function, by the three-dimensional measuring instrument 420. When the errors in position control are not equal to or smaller than the predetermined threshold, the process goes to step S160 and, like the above described step S110, one or more real reference positions and one or more control reference positions are added. Then, the process returns to step S130 and processing at steps S130 to S150 is repeated. When the errors in position control are equal to or smaller than the predetermined threshold, the process goes to step S210, which will be described later.

Figure 8:
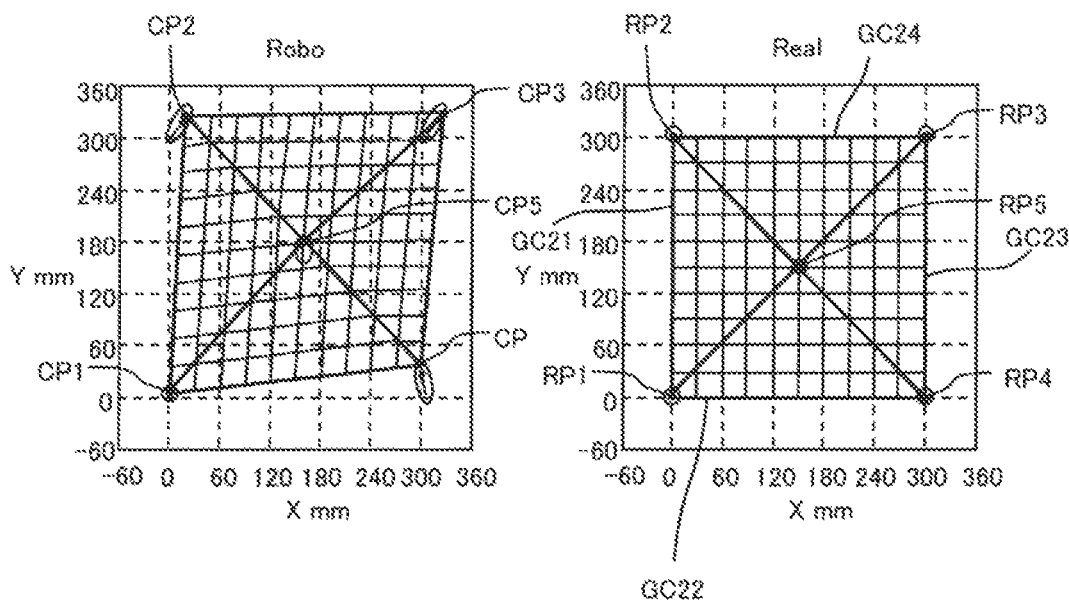
FIG. 8 is an explanatory diagram showing another example of the figures for control position correction.

FIG. 8 is an explanatory diagram showing another example of the figures for control position correction when the real reference positions and the control reference positions are added. In this example, a fifth real reference position RP5 is added at the center of the above described four real reference positions RP1 to RP4 in FIG. 7 and a fifth control reference position CP5 is added at the center of the four control reference positions CP1 to CP4. In the real space, an area containing the five real reference positions RP1 to RP5 is divided into four figures GC21 to GC24. In the example of FIG. 8, the individual figures are smaller than those in FIG. 7, and errors in position control can be made smaller. Note that it is preferable to set the real reference position added to reduce the errors in position control inside of the area surrounded by the previous plurality of real reference positions. The same applies to the control reference positions.

Figures 9, 10:
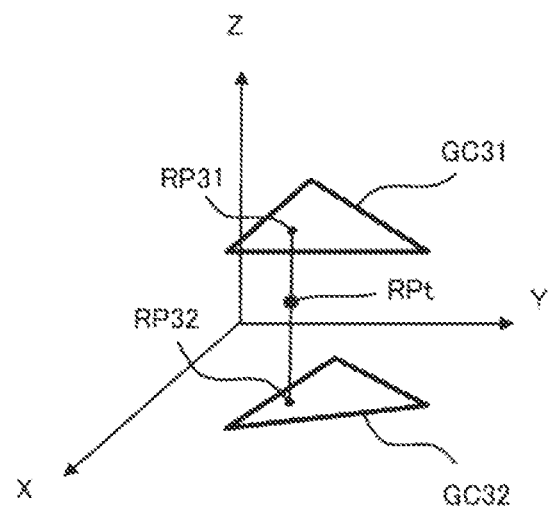
FIG. 9 is an explanatory diagram showing errors of control positions in comparison among cases with correction and without correction.
FIG. 10 is an explanatory diagram showing a correction method when a target position is not contained within figures for control position correction.

FIG. 9 is an explanatory diagram showing errors of control positions in comparison among cases with correction and without correction. Here, errors of control positions in a case where correction of control positions using the transform function is not performed, a case where correction of control positions using the figures shown in FIG. 7 is performed, and a case where correction of control positions using the figures shown in FIG. 8 is performed are shown. As will be understood from the example, the correction using the transform function is performed, and thereby, the errors of control positions may be significantly reduced. Further, the sizes of the figures to which the transform function is applied are made smaller, and thereby, the errors may be further reduced.

The above described steps S110 to S160 correspond to a preparation process and the next step S210 and the subsequent steps correspond to a correction process in which correction of real control positions is performed. The processing at step S210 and the subsequent steps may be executed by another information processing apparatus than the information processing apparatus 300 or the control apparatus 200.

At step S210, the control position determination unit 312 receives input of a target position of the control point TCP. The target position of the control point TCP is a three-dimensional position of a point within the real space to which the control point TCP is desired to be moved. The target position of the control point TCP may be set by the worker using the input device 340. Note that, when the worker creates the motion program RP and the target position of the control point TCP is described in the motion command therein, the control position determination unit 312 may perform the processing at step S210 by acquiring the target position contained in the motion command of the motion program RP.

At step S220, the control position determination unit 312 selects an object figure for calculation of a control position for the target position from the figures for control position correction created at step S130. As the object figure, a figure containing the target position is selected in a normal case. "Figure containing the target position" refers to a figure in which the target position exists in an area surrounded by the outer edge of the figure. A case where the target position is not contained in any of the figures for control position correction will be described later. At step S230, the control position determination unit 312 calculates a target control position for the target position using the transform function corresponding to the object figure. For example, in the above described expression (1), coordinate values of the target position are input to the $P_{real}$, and thereby, the $P_{ctrl}$ may be calculated as the target control position.

At step S240, the control position determination unit 312 describes a motion command using the target control position obtained at step S230. Note that, when the motion program RP containing the motion command is created in advance, the processing at step S240 may be executed by replacement of the target position contained in the motion command by the target control position.

At step S250, the control position determination unit 312 determines whether or not the processing at steps S210 to S240 is finished with respect to the target positions of all control points necessary for the motion program RP. When the processing is not finished, the processing at steps S210 to S240 is executed again and, when the processing is finished, the process goes to the next step S260. At step S260, the control of the robot 100 is executed using the motion program containing the created motion command. The control at step S260 may be executed by the processor 310 of the information processing apparatus 300 or executed by the control apparatus 200.

As described above, in the above described embodiment, the target position within the real space is transformed to the target control position in the robot control coordinate system using the transform function within the figure set within the real space, and thereby, the accuracy of the position control of the robot 100 may be increased.

Note that the shape of the figure for control position correction is not limited to the triangular shape or the transform function is not limited to the affine transform. For example, the figure for control position correction may be a rectangle and the transform function may be projection transform. Or, when the area containing the plurality of real reference positions is divided into a plurality of figures, a plurality of types of polygons may be mixed and the transform function may be changed with respect to each figure. Or, the figure for control position correction may be a solid figure. The transform function may be formed as a transform expression or in another form such as a lookup table.

FIG. 10 is an explanatory diagram showing a correction method when the target position is not contained within the figure for control position correction. In this example, a target position RPt is not contained in any of two figures GC31, GC32. More specifically, the target position RPt is in a position between the two figures GC31, GC32. For M as an integer equal to or larger than two, when M figures for control position correction are set and the target position RPt is not contained in any of the M figures, it is preferable that the two figures GC31, GC32 closest to the target position RPt are selected as object figures. In this case, in the two object figures GC31, GC32, corresponding target positions RP31, RP32 corresponding to the target position RPt are respectively determined, and corresponding target control positions as control positions for the corresponding target positions RP31, RP32 are calculated using the transform function. Then, the target control position for the target position RPt may be calculated by interpolation using the corresponding target control positions calculated in the two object figures GC31, GC32. The above described processing is performed, and thereby, even when the target position is not contained in any of the M figures, the target position within the real space may be correctly transformed to the target control position in the robot control coordinate system using interpolation. In the example of FIG. 10, the corresponding target position RP31 is a point at the shortest distance from the target position RPt in the object figure GC31. The same applies to the corresponding target position RP32. Note that the corresponding target positions RP31, RP32 may be determined using another method. The number of selected object figures is preferably two for simpler processing, but may be three or more. The transform of the target position using interpolation can be applied to a case where the figure for control position correction is a solid figure. As the interpolation, various interpolation expressions of linear interpolation or the like may be used.

Figure 11:
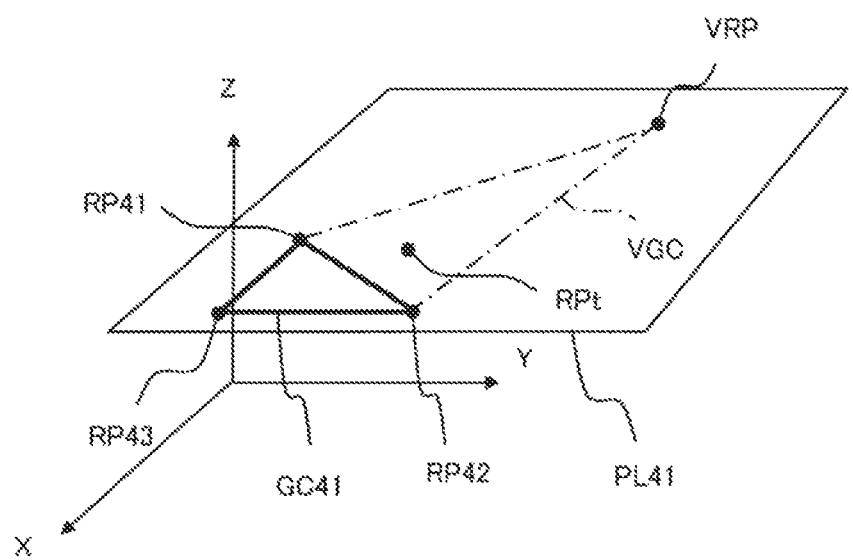
FIG. 11 is an explanatory diagram showing another correction method when a target position is not contained within a figure for control position correction.

FIG. 11 is an explanatory diagram showing another correction method when the target position is not contained within the figure for control position correction. This example is the same as the case in FIG. 10 in that the target position RPt is not contained in any of the figures for control position correction, however, different from FIG. 10 in that the target position RPt exists outside of a figure GC41 closest to the target position RPt. In the present disclosure, the term "existing outside of the figure" means, for M as an integer equal to or larger than two, not between any two figures of the M figures. In this case, it is preferable to set a virtual real reference position VRP. In the real reference position VRP, it is assumed that a real position and a control position coincide. Further, in a case where the figure GC41 is a planar figure, it is preferable to set the real reference position VRP on a plane PL41 on which the figure GC41 exists. The control position determination unit 312 sets a virtual figure VGC containing the target position RPt using the virtual real reference position VRP and two real reference positions RP41, RP42 selected from three real reference positions RP41 to RP43 forming the vertices of the figure GC41. Further, the control position determination unit 312 generates a transform function expressing a correspondence relationship between a real position and a control position within the virtual figure VGC. The target control position for the target position RPt is calculated using the transform function in the virtual figure VGC, and thereby, excessive increase of a control error may be prevented compared to a case where the target control position for the target position RPt is calculated using extrapolation. Particularly, in the virtual real reference position VRP, coincidence of the real position and the control position is assumed, and there is an advantage that the control error does not excessively increase even when the target position RPt is in a position apart from the figure GC41.

It is preferable that the virtual real reference position VRP is set sufficiently far from the figure GC41. For example, it is preferable that the virtual real reference position VRP is set outside of the motion range of the control point TCP of the robot 100. As a method for determining a specific position of the virtual real reference position VRP, various methods can be employed. For example, the center of gravity of a triangle formed by the target position RPt and the two real reference positions RP41, RP42 is obtained, and a position at a predetermined distance from the target position RPt on a straight line connecting the center of gravity and the target position RPt may be set as the virtual real reference position VRP.

The setting of the figure using the virtual real reference position VRP and the generation of the transform function can be applied to a case where the figure for control position correction is a solid figure. For n as an integer equal to or larger than four, in a case where the figure for control position correction is a solid figure having n vertices, a virtual figure VGC may be set using the real reference positions at the (n−1) vertices of the figure closest to the target position RPt and the virtual real reference position VRP.

Note that, when the target position RPt is not contained in any of the figures for control position correction, the figure closest to the target position RPt may be selected as an object figure. In this case, the target control position corresponding to the target position RPt may be obtained using the transform function for the figure. In this manner, even when the target position RPt is not contained in any of the figures for control position correction, the target position RPt within the real space is transformed to the target control position in the robot control coordinate system using the figure closest to the target position, and excessive increase of the error may be prevented.

Figure 12:
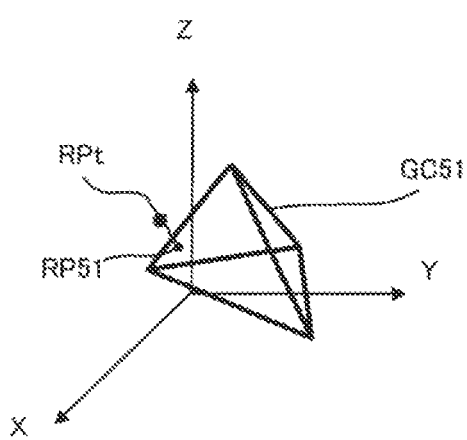
FIG. 12 is an explanatory diagram showing another example of the figure for control position correction.

FIG. 12 is an explanatory diagram showing another example of the figure for control position correction. In this example, a solid figure CG51 is set as a figure for control position correction within the real space. When the solid figure is used, for M as an integer equal to or larger than two, it is preferable to closely place M solid figures in the real space. In this manner, the target position may be correctly transformed to the target control position in the robot control coordinate system using the transform function within the solid figure containing the target position. The transform function in this case may be created as e.g. a lookup table.

Note that, in the case where the M solid figures are closely placed in the real space, when the target position RPt is set near the outer edge of the motion area of the robot 100, the target position RPt may be a position outside of the M solid figures and not contained in any of the M figures. In this case, it is preferable to select the figure GC51 closest to the target position RPt as the object figure and, in the selected object figure GC51, determine a corresponding target position RP51 corresponding to the target position RPt and calculate the corresponding target control position for the corresponding target position RP51 using the transform function. In this case, extrapolation using the calculated corresponding target control position is performed, and thereby, the target control position for the target position RPt may be calculated. In this manner, even when the target position is not contained in any of the M figures, the target position may be accurately transformed to the target control position in the robot control coordinate system. In the example of FIG. 12, the corresponding target position RP51 is a point at the shortest distance from the target position RPt in the object figure GC51. Note that the corresponding target position RP51 may be determined using another method. The number of selected object figures is preferably one for simpler processing, but may be two or more.

Figure 13:
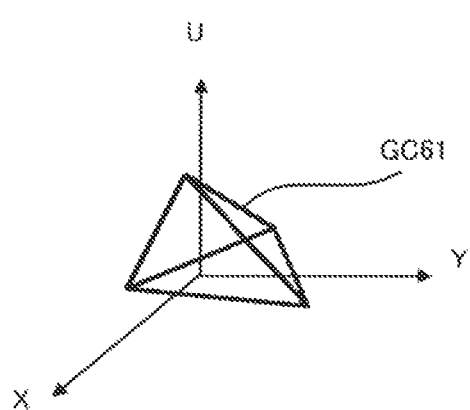
FIG. 13 is an explanatory diagram showing yet another example of the figure for control position correction.

FIG. 13 is an explanatory diagram showing yet another example of the figure for control position correction. In this example, a solid figure GC61 is set as a figure for control position correction within a three-dimensional space defined by an X-axis, a Y-axis, and a U-axis of a scalar robot. The U-axis is an axis indicating a rotation angle of a first joint. In this manner, not only the position but also a figure for control position correction may be set in a real space having an axis indicating a posture by the rotation angle. This applies to another type of robot e.g. a vertical articulated robot.

Generally, in the articulated robot, not only the position of the control point TCP but also the posture thereof may be controlled. Accordingly, in a multidimensional space in consideration of all the positions and the configurations of the control point TCP, figures for control position posture correction may be set and correction of the control positions may be performed using transform functions applied to the individual figures. For example, in the case of the six-axis robot shown in FIG. 1, the figures for control position posture correction can be set in a six-dimensional space in consideration of all the positions and the postures.

When both the position and the posture are transformed by the transform function, at steps S110 and S120 in FIG. 4, N real reference postures as postures of the robot 100 in the N real reference positions and N target control postures as control postures in N target control positions are also acquired. Further, at step S140, the transform function is generated to also express a relationship between a real posture and a control posture in each figure of the M figures. Furthermore, at step S210, input of the target posture with the target position is received. At step S230, the target control posture for the target posture is calculated using the transform function and, at step S240, the motion command is described using the target control posture with the target control position. In this manner, not only the target position but also the target posture is transformed using the transform functions, and thereby, accuracy of both position control and posture control of the robot 100 may be increased.

Other Embodiments

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined to solve part or all of the problems of the present disclosure or achieve part or all of the effects of the present disclosure. The technical features not described as essential features in this specification can be appropriately deleted.

(1) According to a first aspect of the present disclosure, a method for determining a control position of a robot is provided. The method includes (a) acquiring N real reference positions in a real space and N control reference positions in a robot control coordinate system when a control point of the robot is located in the respective N real reference positions, N being an integer equal to or larger than three, (b) setting M figures having vertices in a plurality of real reference positions of the N real reference positions within the real space, and obtaining a transform function expressing a correspondence relationship between a real position and a control position within each figure, M being an integer equal to or larger than one, (c) receiving input of a target position of the control point in the real space, (d) selecting an object figure for calculation of a control position for the target position from the M figures, and (e) calculating a target control position as a control position in the robot control coordinate system for the target position using the transform function with respect to the object figure.

According to the method, the target position within the real space is transformed to the target control position in the robot control coordinate system using the transform function within the figure set within the real space, and thereby, the accuracy of position control of the robot may be increased.

(2) In the above described method, M may be an integer equal to or larger than two, (d) may include selecting two or more figures closest to the target position as the object figures when the target position is not contained in any of the M figures, and (e) may include (e1) calculating a corresponding target control position as a control position for a corresponding target position corresponding to the target position in each of the two or more object figures, and (e2) calculating the target control position for the target position by interpolation using the corresponding target control positions calculated in the two or more object figures.

According to the method, even when the target position is not contained in any of the M figures, the target position within the real space may be accurately transformed to the target control position in the robot control coordinate system using interpolation.

(3) In the above described method, (d) may include selecting a figure closest to the target position of the M figures as the object figure when the target position is not contained in any of the M figures.

According to the method, even when the target position is not contained in any of the M figures, the target position within the real space is transformed to the target control position in the robot control coordinate system using the figure closest to the target position, and thereby, excessive increase of an error may be prevented.

(4) In the above described method, (d) may include, when the target position is not contained in any of the M figures, (d1) setting a virtual real reference position in which a real position and a control position coincide, (d2) setting a virtual figure containing the target position using the virtual real reference position and a plurality of real reference positions selected from the N real reference positions, and selecting the virtual figure as the object figure, and (d3) obtaining a transform function expressing a correspondence relationship between a real position and a control position within the virtual figure.

According to the method, even when the target position is not contained in any of the M figures, the target position within the real space is transformed to the target control position in the robot control coordinate system using the virtual figure set using the virtual real reference position, and thereby, excessive increase of an error may be prevented.

(5) In the above described method, M may be an integer equal to or larger than two, and the M figures may be M solid figures closely placed in the real space.

According to the method, the target position may be accurately transformed to the target control position in the robot control coordinate system using the transform function within the figure containing the target position.

(6) In the above described method, (d) may include selecting one or more figures closest to the target position as the object figures when the target position is not contained in any of the M figures, and (e) may include (e1) calculating a corresponding target control position as a control position for a corresponding target position corresponding to the target position in each of the one or more object figures, and (e2) calculating the target control position for the target position by extrapolation using the corresponding target control positions calculated in the one or more object figures.

According to the method, even when the target position is not contained in any of the M figures, the target position may be accurately transformed to the target control position in the robot control coordinate system using extrapolation.

(7) The above described method may further include (i) obtaining a position control error when controlling the robot using the target control position, (ii) acquiring (N+1) or more real reference positions and (N+1) or more control reference positions by adding one or more new real reference positions and one or more new control reference positions when the position control error exceeds a predetermined threshold, and (iii) increasing the M by executing (b) again using the (N+1) or more real reference positions and the (N+1) or more control reference positions.

According to the method, when the position control error exceeds the threshold, the real reference positions and the control reference positions are added, and thereby, the position control error may be made equal to or smaller than the threshold.

(8) In the above described method, one of the real reference position and the control reference position may be selected by a worker.

According to the method, one of the real reference position and the control reference position is selected by the worker, and thereby, an area in which the accuracy of position control is increased may be optionally selected by the worker.

(9) In the above described method, (a) may include obtaining N real reference postures as postures of the robot in the N real reference positions and N target control postures as control postures in the N target control positions, at (b), the transform function may be generated to also express a relationship between a real posture and a control posture in each figure of the M figures, (c) may include receiving a target posture with the target position, and (e) may include calculating a target control posture as a control posture in the robot control coordinate system for the target posture using the transform function.

According to the method, not only the target position but also the target posture are transformed using the transform functions, and thereby, accuracy of both position control and posture control of the robot may be increased.

(10) According to a second aspect of the present disclosure, a robot system determining a control position of a robot is provided. The robot system includes a robot, and a control unit that controls the robot. The control unit executes (a) processing of acquiring N real reference positions in a real space and N control reference positions in a robot control coordinate system when a control point of the robot is located in the respective N real reference positions, N being an integer equal to or larger than three, (b) processing of setting M figures having vertices in a plurality of real reference positions of the N real reference positions within the real space, and obtaining a transform function expressing a correspondence relationship between a real position and a control position within each figure, M being an integer equal to or larger than one, (c) receiving input of a target position of the control point in the real space, (d) selecting an object figure for calculation of a control position for the target position from the M figures, and (e) calculating a target control position as a control position in the robot control coordinate system for the target position using the transform function with respect to the object figure.

According to the robot system, the target position within the real space is transformed to the target control position in the robot control coordinate system using the transform function within the figure set within the real space, and thereby, the accuracy of position control of the robot may be increased.

The present disclosure can be realized in other various aspects than those described as above. For example, the present disclosure may be realized in aspects of a robot system including a robot and a robot control apparatus, a computer program for realizing functions of the robot control apparatus, a non-transitory storage medium in which the computer program is recorded, etc.

What is claimed is:

1. A method for determining a control position of a robot, comprising:
   (a) acquiring N real reference positions in a real space and N control reference positions in a robot control coordinate system when a control point of the robot is located in the respective N real reference positions, N being an integer equal to or larger than three;
   (b) setting M figures having vertices in a plurality of real reference positions of the N real reference positions within the real space, and obtaining a transform function expressing a correspondence relationship between a real position and a control position within each figure, M being an integer equal to or larger than one;

(c) receiving input of a target position of the control point in the real space;

(d) selecting an object figure for calculation of a control position for the target position from the M figures; and (e) calculating a target control position as a control position in the robot control coordinate system for the target position using the transform function with respect to the object figure, wherein (d) includes selecting a figure closest to the target position of the M figures as the object figure when the target position is not contained in any of the M figures.

2. The method according to claim 1, wherein

M is an integer equal to or larger than two, (d) includes selecting two or more figures closest to the target position as the object figures when the target position is not contained in any of the M figures, and (e) includes:

(e1) calculating a corresponding target control position as a control position for a corresponding target position corresponding to the target position in each of the two or more object figures; and (e2) calculating the target control position for the target position by interpolation using the corresponding target control positions calculated in the two or more object figures.

3. The method according to claim 1, wherein (d) includes: when the target position is not contained in any of the M figures, (d1) setting a virtual real reference position in which a real position and a control position coincide;

(d2) setting a virtual figure containing the target position using the virtual real reference position and a plurality of real reference positions selected from the N real reference positions, and selecting the virtual figure as the object figure; and (d3) obtaining a transform function expressing a correspondence relationship between a real position and a control position within the virtual figure.

4. The method according to claim 1, wherein

M is an integer equal to or larger than two, and the M figures are M solid figures closely placed in the real space.

5. The method according to claim 4, wherein (d) includes selecting one or more figures closest to the target position as the object figures when the target position is not contained in any of the M figures, and (e) includes:

(e1) calculating a corresponding target control position as a control position for a corresponding target position corresponding to the target position in each of the one or more object figures; and (e2) calculating the target control position for the target position by extrapolation using the corresponding target control positions calculated in the one or more object figures.

6. The method according to claim 1, further comprising:

(i) obtaining a position control error when controlling the robot using the target control position;

(ii) acquiring (N+1) or more real reference positions and (N+1) or more control reference positions by adding one or more new real reference positions and one or more new control reference positions when the position control error exceeds a predetermined threshold; and (iii) increasing the M by executing (b) again using the (N+1) or more real reference positions and the (N+1) or more control reference positions.

7. The method according to claim 1, wherein one of the real reference position and the control reference position is selected by a worker.

8. The method according to claim 1, wherein (a) includes obtaining N real reference postures as postures of the robot in the N real reference positions and N target control postures as control postures in the N target control positions, at (b), the transform function is generated to also express a relationship between a real posture and a control posture within each figure of the M figures, (c) includes receiving a target posture with the target position, and (e) includes calculating a target control posture as a control posture in the robot control coordinate system for the target posture using the transform function.

9. A robot system determining a control position of a robot, comprising:

a robot; and a control unit that controls the robot, wherein the control unit executes (a) processing of acquiring N real reference positions in a real space and N control reference positions in a robot control coordinate system when a control point of the robot is located in the respective N real reference positions, N being an integer equal to or larger than three;

(b) processing of setting M figures having vertices in a plurality of real reference positions of the N real reference positions within the real space, and obtaining a transform function expressing a correspondence relationship between a real position and a control position within each figure, M being an integer equal to or larger than one;

(c) processing of receiving input of a target position of the control point in the real space;

(d) processing of selecting an object figure for calculation of a control position for the target position from the M figures; and (e) processing of calculating a target control position as a control position in the robot control coordinate system for the target position using the transform function with respect to the object figure, wherein (d) includes selecting a figure closest to the target position of the M figures as the object figure when the target position is not contained in any of the M figures.

10. A method for determining a control position of a robot, comprising:

(a) acquiring N real reference positions in a real space and N control reference positions in a robot control coordinate system, each of the N real reference positions corresponding to a control point of the robot where the robot is actually located while the robot moves in the real space, the N control reference positions corresponding to designed positions through which the robot is supposed to move, N being an integer equal to or larger than three;

(b) setting M figures having vertices in a plurality of real reference positions of the N real reference positions within the real space, and obtaining a transform function expressing a correspondence relationship between a real position and a control position within each figure, each of the M figures being in a triangular shape, the M figures being obtained by dividing a rectangular figure having the vertices, M being an integer equal to or larger than one;
(c) receiving input of a target position of the control point in the real space, the target position being a position to which the robot is supposed to reach;
(d) selecting an object figure for calculation of a control position for the target position from the M figures;
(e) calculating a target control position as a control position in the robot control coordinate system for the target position using the transform function with respect to the object figure; and
(f) describing a motion command for the robot based on the calculated target control position.

* * * * *